(12) United States Patent
Duan et al.

(10) Patent No.: US 11,251,559 B2
(45) Date of Patent: Feb. 15, 2022

(54) CONNECTOR FOR PHOTOVOLTAIC CELL

(71) Applicant: ZHEJIANG RENHE PHOTOVOLTAIC TECHNOLOGY CO., LTD., Cixi (CN)

(72) Inventors: Lijun Duan, Cixi (CN); Li Su, Cixi (CN)

(73) Assignee: ZHEJIANG RENHE PHOTOVOLTAIC TECHNOLOGY CO., LTD., Cixi (CN)

(*) Notice: Subject to any disclaimer, the term of this patent is extended or adjusted under 35 U.S.C. 154(b) by 0 days.

(21) Appl. No.: 16/894,544

(22) Filed: Jun. 5, 2020

(65) Prior Publication Data
US 2021/0036455 A1 Feb. 4, 2021

(51) Int. Cl.
| | |
|---|---|
| H01R 13/42 | (2006.01) |
| H02S 40/34 | (2014.01) |
| H01R 13/02 | (2006.01) |
| H01R 13/502 | (2006.01) |
| H01R 13/59 | (2006.01) |
| H01R 24/00 | (2011.01) |

(52) U.S. Cl.
CPC ............ *H01R 13/42* (2013.01); *H01R 13/02* (2013.01); *H01R 13/502* (2013.01); *H01R 13/59* (2013.01); *H01R 24/00* (2013.01); *H02S 40/34* (2014.12)

(58) Field of Classification Search
CPC ...... H01R 13/42; H01R 13/02; H01R 13/502; H01R 13/59; H01R 24/00; H01R 13/5205; H01R 2101/00; H01R 13/426; H01R 13/40; H01R 9/05; H01R 9/0518; H01R 9/0524; H01R 24/38; H01R 13/46; H02S 40/34; H02S 40/36; Y02E 10/50

USPC ......................................... 439/578, 583–585
See application file for complete search history.

(56) References Cited

U.S. PATENT DOCUMENTS

| | | | | |
|---|---|---|---|---|
| 3,295,076 A | * | 12/1966 | Kraus | H01R 9/0521 333/260 |
| 3,609,651 A | * | 9/1971 | Sladek | H01R 9/05 29/867 |
| 5,620,339 A | * | 4/1997 | Gray | H01R 4/489 439/578 |
| 8,657,624 B2 | * | 2/2014 | Yoshida | H01R 13/5219 439/578 |
| 9,882,317 B1 | * | 1/2018 | Lane | H01R 24/20 |
| 2012/0270450 A1 | * | 10/2012 | Leonhard | H01R 13/443 439/680 |

* cited by examiner

*Primary Examiner* — Travis S Chambers
(74) *Attorney, Agent, or Firm* — Jiwen Chen; Jacobson Holman PLLC

(57) ABSTRACT

A connector for a photovoltaic cell includes a conductive portion and an insulating portion, wherein the conductive portion is wrapped with the insulating portion; the conductive portion includes a conductor and a cable line, and a retaining ring is arranged on the outer circumferential surface of the conductor; the insulating portion includes a shell body, a basket-shaped fastener and a front sleeve; a first inner step surface and a second inner step surface are arranged in an inner cavity of the shell body; the front sleeve has an annular head part which sleeves the conductor; a first outer step surface is arranged at a tail part of the front sleeve, and props against the first inner step surface; the inner diameter of the head part of the front sleeve is larger than the outer diameter of the conductor and less than the outer diameter of the retaining ring.

3 Claims, 8 Drawing Sheets

CONNECTOR FOR PHOTOVOLTAIC CELL

This application claims the priority benefit of Chinese Application No. 201910688127X, filed Jul. 29, 2019, which is hereby incorporated by reference.

TECHNICAL FIELD

The present invention belongs to the technical field of electric connection, and more particularly relates to a connector for a photovoltaic cell.

BACKGROUND TECHNOLOGY

Connectors are very important accessories in photovoltaic power generation to achieve electrical connection among solar panels. Due to the long use time of solar power stations and the harsh environment, the requirements for the stability and reliability of the connectors are very high. The mainstream connector in the prior art is embodied in such a manner (as shown in FIG. 1): taking a male head or a female head as an example, the connector can be divided into a conductive portion and an insulating portion, wherein the conductive portion is wrapped within the insulating portion. The conductive portion is composed of a conductor 2 and a cable line 1 which are riveted each other. The insulating portion is relatively complicated and comprises a shell body 7 and a nut 3 which are connected by threads, and the insulating portion further comprises a basket-shaped fastener which is composed of a fastening sleeve 4 and a liner pipe 5. When the nut is tightened, the inner diameter of the nut is reduced to hoop the cable line and prevent the cable line from displacing. The conductor 2 has a cylindrical main body. A plurality of retaining teeth 21 which extends backward and outward are arranged on the outer circumferential surface of the conductor 2. The insulating portion further comprises an annular retaining coil 8, wherein one end of the retaining coil 8 props against the retaining teeth 21, and the other end of the retaining coil 8 props against the basket-shaped fastener. After various components are installed in sequence and the nut is fastened, the conductor is pressed by the fastener and will not rotate or loosen in a circumferential direction, and is also pressed by the retaining coil and will not move backward in an axial direction. The retaining teeth enlarge the outer diameter of the conductor, and therefore are restricted by the shell body, and cannot move forward in an axial direction. Therefore, a stable connector structure is formed.

As found in use, by means of such structural design of the connector, after the cable line is hooped by the basket-shaped fastener, the nut is tightened continuously to push the fastener, the retaining coil, the cable line and the conductor to move forward, till the retaining teeth of the conductor prop against the shell body, and various components are in a locked state in all directions. This state will be maintained throughout the life of the connector, possibly reaching 10-20 years. After the retaining teeth of the conductor prop against the shell body, the shell body suffers from stress. In consideration that the shell body has been under stress for so long, and this portion is often the weakest portion of the shell, the risk of shell cracking will occur. Especially in desert areas, such accidents have already occurred, which may bring risks such as short circuit caused by water leakage and even electric shock.

SUMMARY OF THE INVENTION

An object of the present invention is to provide a more reliable connector for a photovoltaic cell.

To fulfill said object, the technical solution adopted by the present invention is as follows: a connector for a photovoltaic cell comprising a conductive portion and an insulating portion, wherein the conductive portion is wrapped with the insulating portion; the conductive portion is composed of a conductor and a cable line which are riveted with each other; the insulating portion comprises a shell body and a nut which are connected by threads; the shell body has an inner cavity; the insulating portion further comprises a basket-shaped fastener which sleeves the cable line to hoop the cable line; and the connector is characterized in that:

a main body of the conductive body is cylindrical, and a rigid retaining ring is arranged on an outer circumferential surface of the conductor; the insulating portion further comprises a front sleeve which is divided into a head part, a main body and a tail part, wherein an outer diameter of the tail part is larger than that of the main body to form a first outer step surface; the inner cavity of the shell body is divided into a front part, a middle part and a rear part, wherein an inner diameter of the rear part is larger than that of the middle part to form a first inner step surface; an inner diameter of the middle part is larger than that of the front part to form a second inner step surface; the first outer step surface props against the first inner step surface, thereby blocking the front sleeve from moving forward; an inner diameter of the head part of the front sleeve is larger than an outer diameter of the conductor and less than an outer diameter of the retaining ring; a certain gap is reserved between the head part of the front sleeve and the second inner step surface of the inner cavity of the shell body; the conductor passes through the head part of the front sleeve and enters the front part of the inner cavity of the shell body; and the retaining ring of the conductor is blocked by the head part of the front sleeve.

Further, a certain gap is reserved between a periphery of the head part of the front sleeve and the inner cavity of the shell body.

Further, the inner diameter of the main body of the front sleeve is larger than that of the head part of the front sleeve, and two inner walls are in transitional connection through an inclined surface.

The following technical solution may also be adopted: a plurality of non-return teeth which extend inward are arranged on the main body of the front sleeve; the inner diameter of a ring formed by the non-return teeth is larger than the outer diameter of the conductor and less than the outer diameter of the retaining ring; when the conductor passes through the head part of the front sleeve, the retaining ring causes the non-return teeth to deform; and the retaining ring is propped by the non-return teeth after passing through the non-return teeth.

The present invention relates to the front sleeve. In the most basic technical solution, the front sleeve only defines the annular head part. In this case, the inner and outer diameters of the head part are the same as those of the main body. Therefore, in fact, the head and the main body cannot be clearly distinguished. The front sleeve functions to withstand stress generated by the retaining ring during the forward extrusion of the conductor. Even if there is a risk of cracking, it occurs on the front sleeve instead of the shell body. Moreover, the front sleeve is placed inside the shell body as a whole, so the requirements for physical and chemical properties of the front sleeve such as insulation are lower than those of the shell body, such that manufacturers may choose materials with a certain elasticity, which can offset the stress generated by the conductor. Therefore, even if the most basic technical solution is adopted, the technical problem of the present invention can also be solved. In this case, it is also necessary to apply a design, such as the retaining ring in the prior art, thereby preventing the conductor from moving backward.

In a further technical solution, the front sleeve has the head part and the main body which are different in inner diameter and are in transitional connection by an inclined surface. The front sleeve is well engaged with the retaining ring on the conductor, thereby preventing the cracking problem better.

In another technical solution, the non-return teeth are further provided on the front sleeve to prop against the retaining ring. In fact, the function of the original retaining ring is integrated onto the front sleeve, such that two functions can be achieved by one component. In the present invention, the retaining teeth on the outer circumferential surface of the conductor in the prior art are replaced with a rigid retaining ring, and the original retaining teeth will deform during installation, shrink inward, and pop out after installation. However, the retaining ring is made of a rigid material and will not deform. When the non-return teeth will be deformed when the retaining ring props against the non-return teeth, so that a better non-return function can be achieved.

A gap is provided between the head part of the front sleeve and the shell body, and therefore, the stress generated by the retaining ring of the conductor is completed borne by the head part of the front sleeve, without being transferred to the shell body. The front sleeve and the shell body are stressed by means of the contact between the first inner step surface and the first outer step surface. The shell body is subject to an axial stress. The shell body itself is approximately tubular, and has an axial strength much greater than the circumferential strength, so there is no quality risk.

BRIEF DESCRIPTION OF THE DRAWINGS

A further description will be made in detail with reference to the accompanying drawings and embodiments of the present invention.

Figure 1:
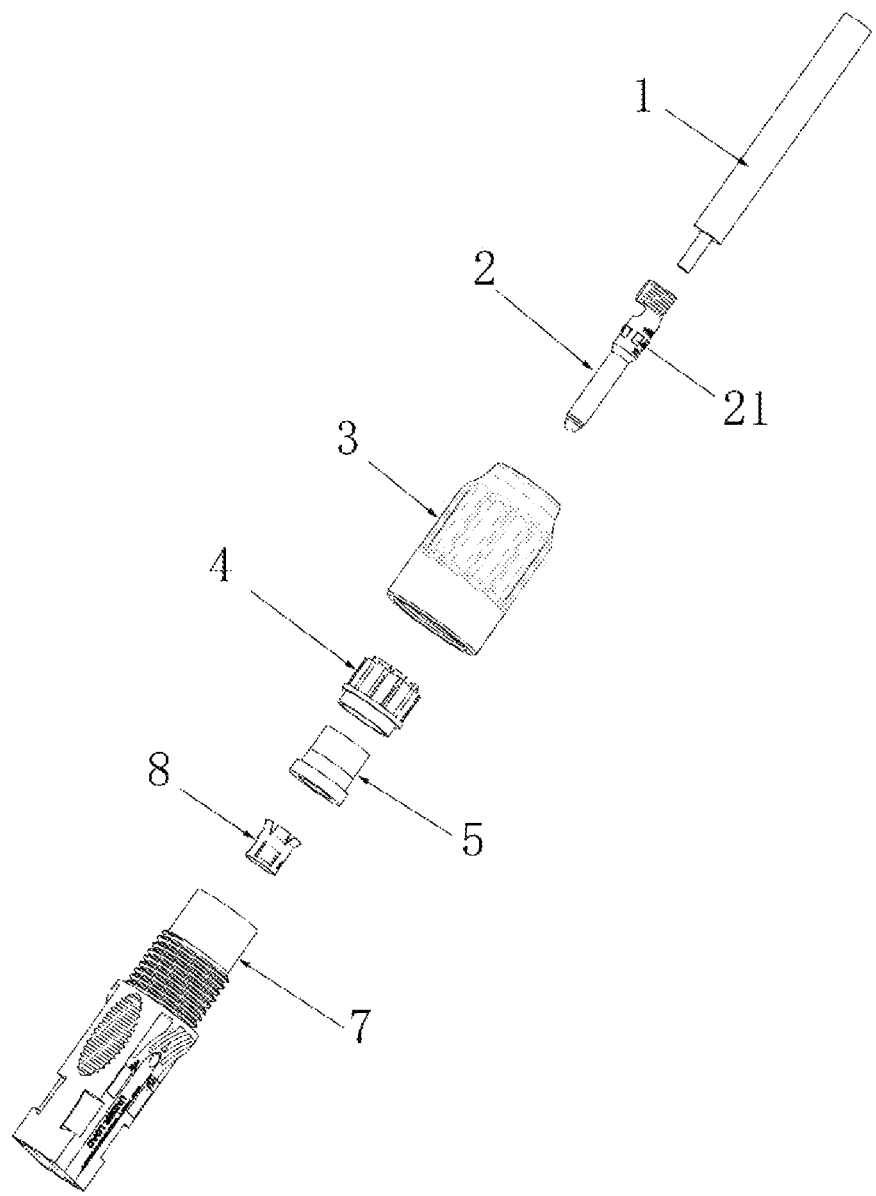
FIG. 1 is a diagram of the prior art.
Figure 2:
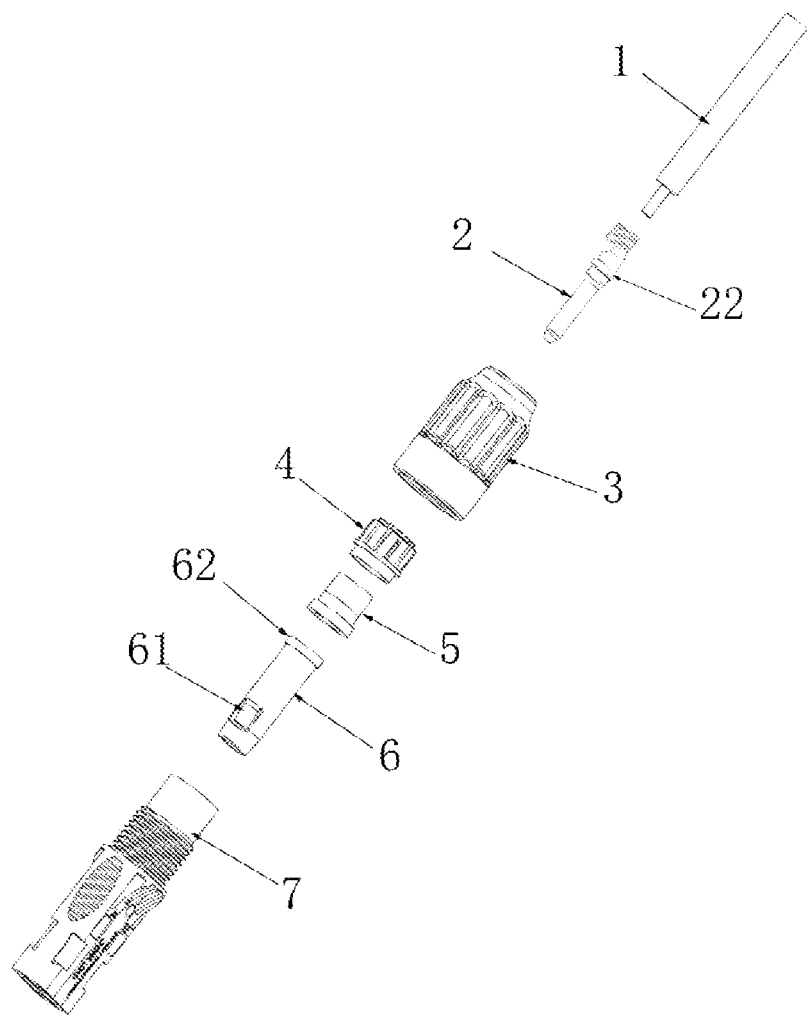
FIG. 2 is an exploded view of components of Embodiment 1 of the present invention.
Figure 3:
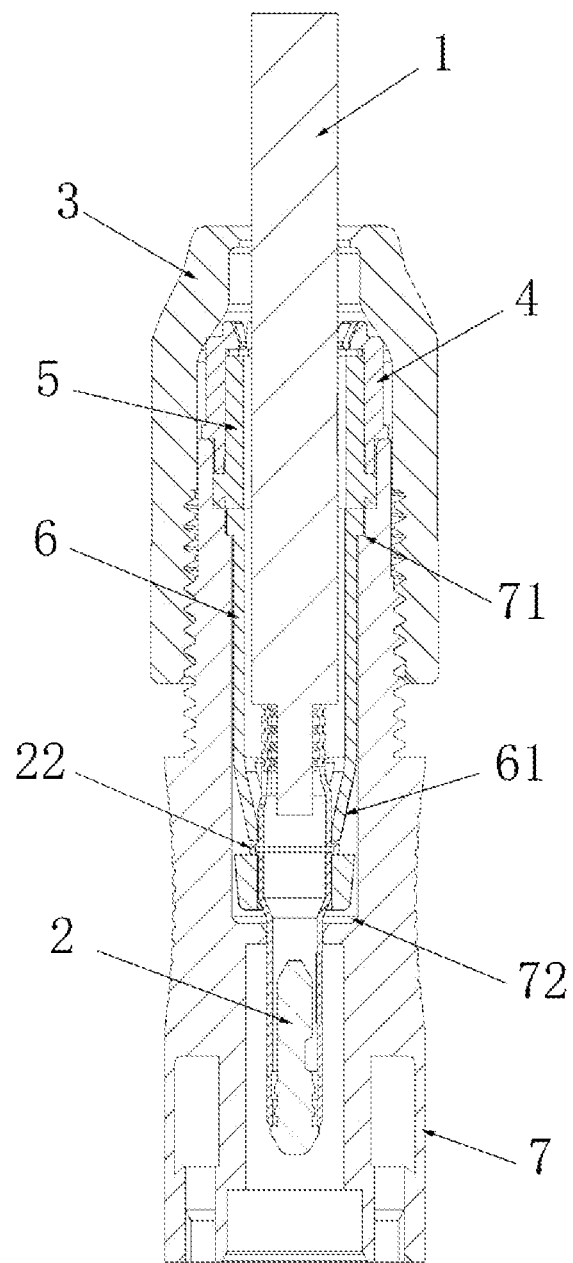
FIG. 3 is a structural sectional view of Embodiment 1 of the present invention.
Figure 4:
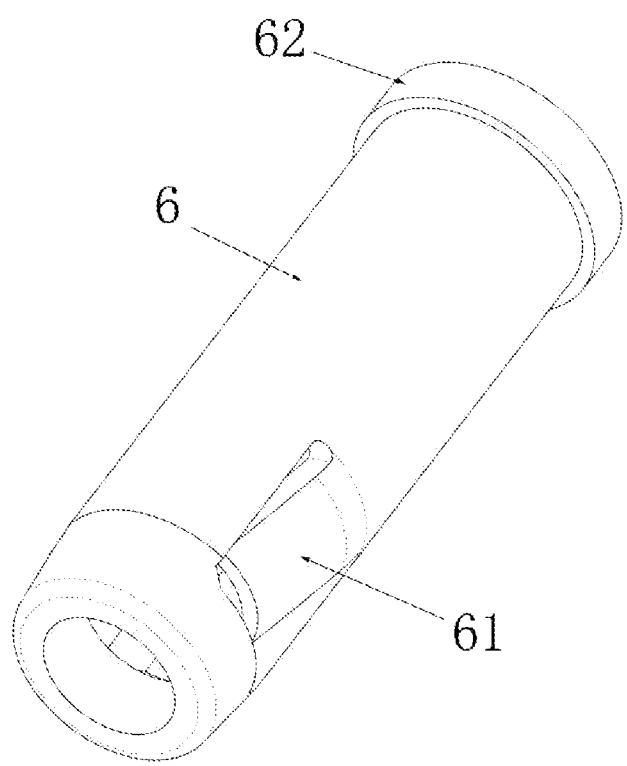
FIG. 4 is a structural schematic diagram of a front sleeve of Embodiment 1 of the present invention.
Figure 5:
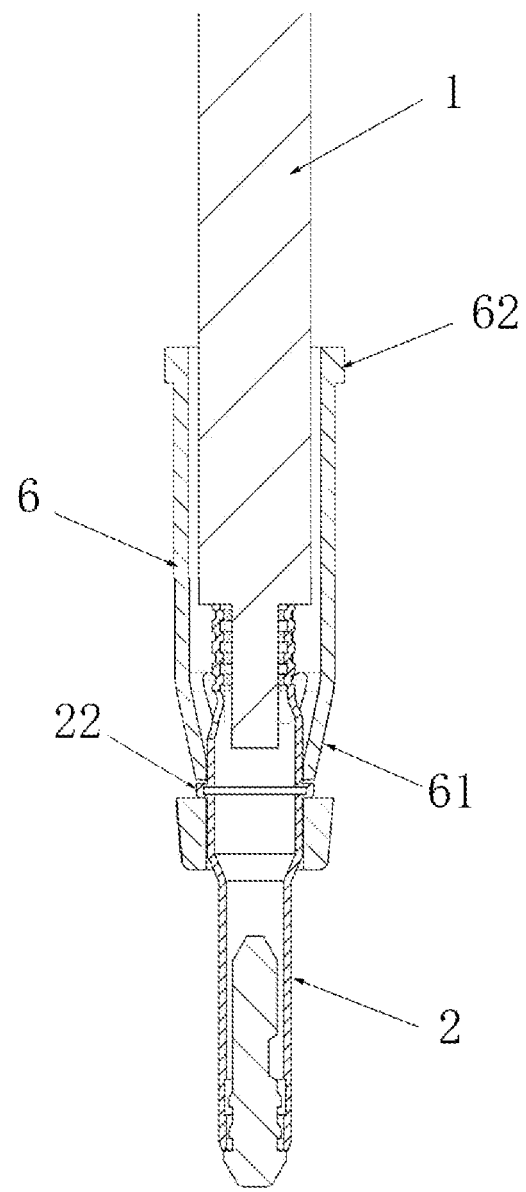
FIG. 5 is an assembled sectional view of a front sleeve and a conductor of Embodiment 1 of the present invention.
Figure 6:
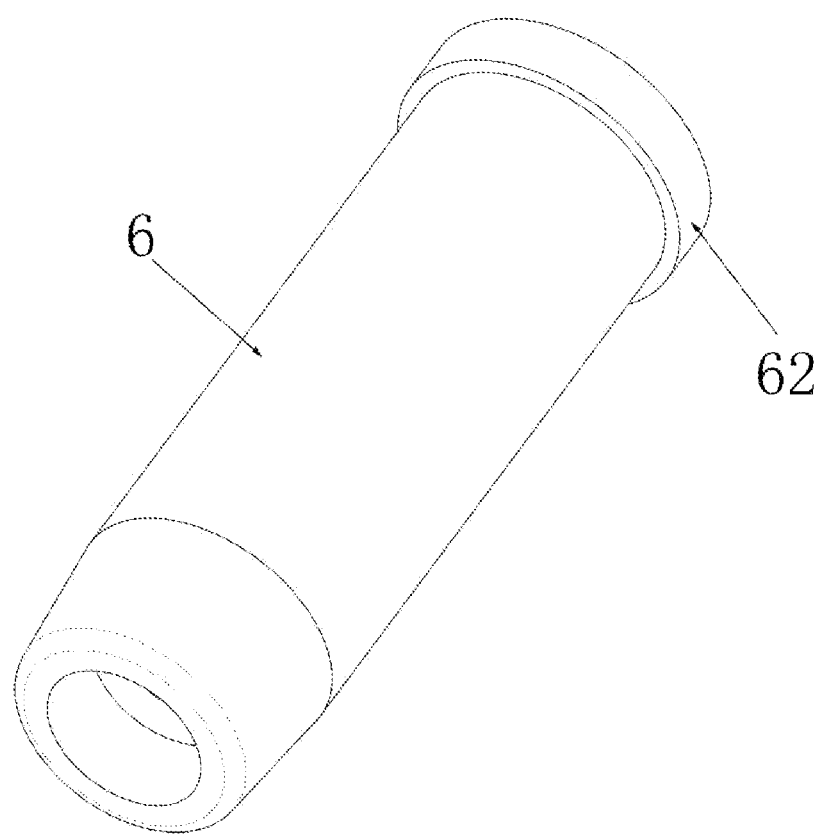
FIG. 6 is a structural schematic diagram of a front sleeve of Embodiment 2 of the present invention.
Figure 7:
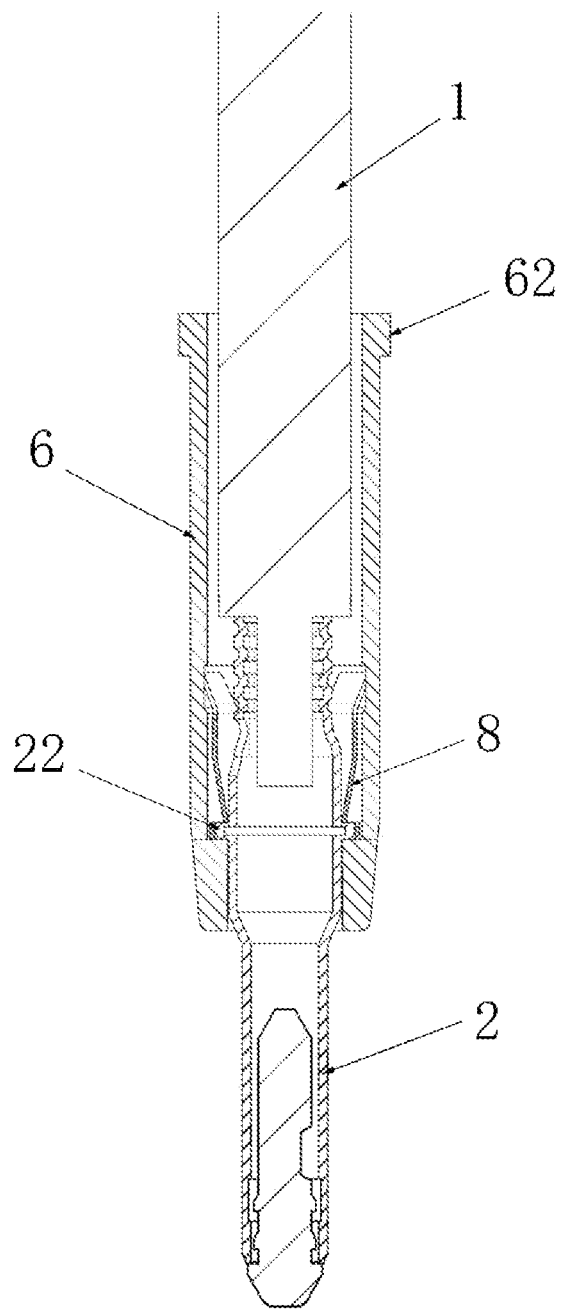
FIG. 7 is an assembled sectional view of a front sleeve and a conductor of Embodiment 2 of the present invention.
Figure 8:
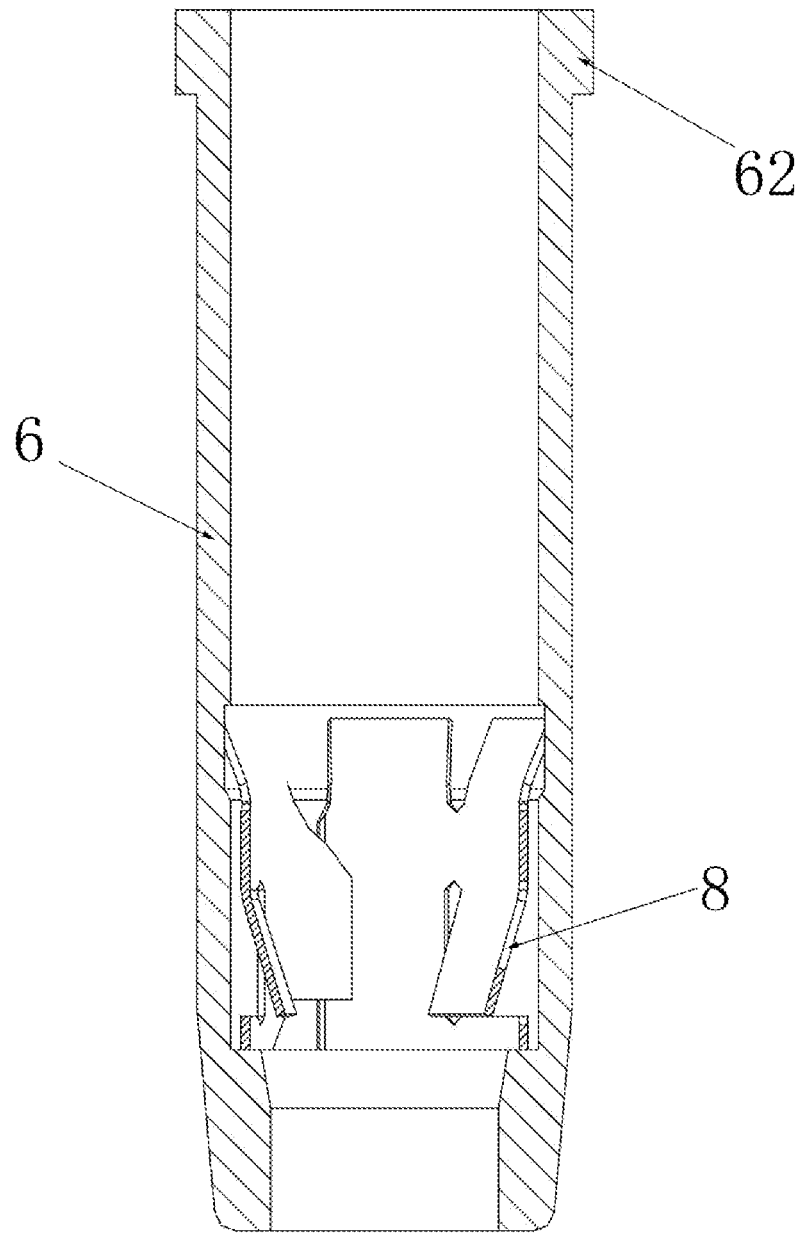
FIG. 8 is an assembled sectional view of a front sleeve and a retaining ring of Embodiment 2 of the present invention.

In drawings, reference symbols represent the following components: cable line 1; conductor 2; retaining teeth 21; retaining ring 22; nut 3; fastening sleeve 4; liner pipe 5; front sleeve 6; non-return teeth 61; first outer step surface 62; shell body 7; first inner step surface 71; second inner step surface 72; retaining coil 8.

DETAILED DESCRIPTION OF THE EMBODIMENTS

Embodiment 1

The connector in this embodiment comprises a conductive portion and an insulating portion, wherein the conductive portion is wrapped with the insulating portion; the conductive portion is composed of a conductor 2 and a cable line 1 which are riveted with each other; the insulating portion comprises a shell body 7 and a nut 3 which are connected by threads; the shell body 7 has an inner cavity; the insulating portion further comprises a basket-shaped fastener which is composed of a basket-shaped fastening sleeve 4 and a liner pipe 5, wherein the basket-shaped fastening sleeve 4 sleeves the liner pipe 5. The basket-shaped fastening sleeve 4, together with the liner pipe 5, sleeves the cable line 1 to hoop the cable line. The conductor 2 is integrally cylindrical, and a head part of the conductor 2 is a smooth cylinder and extends into a front part of the inner cavity of the shell body 7. A tail part of the conductor 2 is provided with a connecting hole for the cable line 1 to be inserted. A rigid retaining ring 22 is arranged on the outer circumferential surface in the middle of the conductor.

The insulating portion further comprises a front sleeve 6 which is divided into a head part, a main body and a tail part, wherein the outer diameter of the tail part is larger than that of the main body to form a first outer step surface 62; the inner cavity of the shell body 7 is divided into a front part, a middle part and a rear part, wherein the inner diameter of the rear part is larger than that of the middle part to form a first inner step surface 71; the inner diameter of the middle part is larger than that of the front part to form a second inner step surface 72; the first outer step surface 62 props against the first inner step surface 71, thereby blocking the front sleeve 6 from moving forward; a certain gap is reserved between the periphery of the head part of the front sleeve and the inner cavity of the shell body. The inner diameter of the head part of the front sleeve 6 is larger than the outer diameter of the conductor 2 and less than the outer diameter of the retaining ring 22; a certain gap is reserved between the head part of the front sleeve 6 and the second inner step surface 72 of the inner cavity of the shell body 7; the conductor 2 passes through the head part of the front sleeve 6 and enters the front part of the inner cavity of the shell body 7; and the retaining ring 22 of the conductor is blocked by the head part of the front sleeve. A plurality of openings are formed in the circumference of the main body of the front sleeve 6. A non-return tooth 61 which bends inwards is provided at each opening. The minimum inner diameter of a ring formed by the non-return teeth 61 is larger than the outer diameter of the conductor and less than the outer diameter of the retaining ring of the conductor, so that the non-return teeth 61 prop against the retaining ring 22.

During the assembling process, the conductor 2 and the cable line 1 are riveted together. The nut 3, the fastener and the front sleeve 6 sleeve the conductor and the cable line in sequence. The head part of the conductor 2 passes through the front sleeve 6. When the retaining ring 22 on the conductor passes through the non-return teeth 61 of the front sleeve 6, since the minimum inner diameter of the ring formed by the non-return teeth 61 is less than the outer diameter of the retaining ring 22 of the conductor 2, the retaining ring 22 will cause the non-return teeth 61 to slightly expand. After the retaining ring 22 completely passes through the non-return teeth 61, the non-return teeth 61 prop against the retaining ring 22, such that the conductor 22 cannot exit from the front sleeve 6. Then, the basket-shaped fastener is tightly hooped on the cable line 1 and props against the tail part of the front sleeve 6, thereby preventing the front sleeve from moving backward. Finally, the front sleeve and the conductor are inserted into the shell body 7, and the nut 3 is rotated so as to be fixedly connected with the shell body 7 through threads, thereby completing the connection between the connector and the cable line.

Embodiment 2

The connector in this embodiment comprises a conductive portion and an insulating portion, wherein the conductive portion is wrapped within the insulating portion; the conductive portion is composed of a conductor 2 and a cable line 1 which are riveted with each other; the insulating portion comprises a shell body 7 and a nut 3 which are connected by threads; the shell body 7 has an inner cavity; the insulating portion further comprises a basket-shaped fastener which is composed of a basket-shaped fastening sleeve 4 and a liner pipe 5, wherein the basket-shaped fastening sleeve 4 sleeves the liner pipe 5. The basket-shaped fastening sleeve 4, together with the liner pipe 5, sleeves the cable line 1 to hoop the cable line. The conductor 2 is integrally cylindrical, and a head part of the conductor 2 is a smooth cylinder and extends into the front part of the inner cavity of the shell body 7. A tail part of the conductor 2 is provided with a connecting hole for the cable line 1 to be inserted. A rigid retaining ring 22 is arranged on the outer circumferential surface in the middle of the conductor.

The insulating portion further comprises a front sleeve 6 which is divided into a head part, a main body and a tail part, wherein the outer diameter of the tail part is larger than that of the main body to form a first outer step surface 62; the inner cavity of the shell body 7 is divided into a front part, a middle part and a rear part, wherein the inner diameter of the rear part is larger than that of the middle part to form a first inner step surface 71; the inner diameter of the middle part is larger than that of the front part to form a second inner step surface 72; the first outer step surface 62 props against the first inner step surface 71, thereby blocking the front sleeve 6 from moving forward; a certain gap is reserved between the periphery of the head part of the front sleeve and the inner cavity of the shell body. The inner diameter of the head part of the front sleeve 6 is larger than the outer diameter of the conductor 2 and less than the outer diameter of the retaining ring 22; a certain gap is reserved between the head part of the front sleeve 6 and the second inner step surface 72 of the inner cavity of the shell body 7; the conductor 2 passes through the head part of the front sleeve 6 and enters the front part of the inner cavity of the shell body 7; and the retaining ring 22 of the conductor is blocked by the head part of the front sleeve. An accommodating cavity which has a shape matched with an annular retaining coil 8 is formed in the main body of the front sleeve 6, and a third inner step surface is formed by the accommodating cavity and the rear inner wall. The annular retaining coil 8 is placed in the accommodating cavity. One end of the retaining coil 8 props against the retaining ring 22, and the other end of the retaining coil 8 props against the third inner step surface in the front sleeve 6.

During the assembling process, the conductor 2 and the cable line 1 are riveted together. The nut 3, the fastener, the retaining coil 8 and the front sleeve 6 sleeve the conductor and the cable line in sequence. The head part of the conductor 2 passes through the front sleeve 6 and the retaining coil 8. When the retaining ring 22 on the conductor passes through the retaining coil 8, the retaining coil 8 will slightly expand. After the retaining ring 22 completely passes through the retaining coil 8, the retaining coil 8 props against the rear part of the retaining ring 22, and the rear part of the retaining coil 8 props against the step surface in the front sleeve 6, such that the conductor 22 cannot exit from the front sleeve 6. Then, the basket-shaped fastener is tightly hooped on the cable line 1 and props against the tail part of the front sleeve 6, thereby preventing the front sleeve from moving backward. Finally, the front sleeve and the conductor are inserted into the shell body 7, and the nut 3 is rotated so as to be fixedly connected with the shell body 7 through threads, thereby completing the connection between the connector and the cable line.

The invention claimed is:

1. A connector for a photovoltaic cell, comprising a conductive portion and an insulating portion, wherein the conductive portion is wrapped within the insulating portion; the conductive portion is composed of a conductor and a cable line which are riveted with each other; the insulating portion comprises a shell body and a nut which are connected by threads; the shell body has an inner cavity; the insulating portion further comprises a basket-shaped fastener which sleeves the cable line to hoop the cable line; and characterized in that:

a main body of the conductor is in a cylindrical shape with an axis, and a rigid retaining ring is arranged on an outer circumferential surface of the conductor; the insulating portion further comprises a front sleeve which is divided into a head part having a front surface being perpendicular to the axis, a main body and a tail part, wherein an outer diameter of the tail part is larger than that of the main body to form a first outer step surface; an inner cavity of the shell body is divided into a front part, a middle part and a rear part, wherein an inner diameter of the rear part is larger than that of the middle part to form a first inner step surface; an inner diameter of the middle part is larger than that of the front part to form a second inner step surface that is perpendicular to the axis; the first outer step surface props against the first inner step surface, thereby blocking the front sleeve from moving forward; an inner diameter of the head part of the front sleeve is larger than an outer diameter of the conductor and less than an outer diameter of the retaining ring; a certain gap in the axial direction is reserved between the front surface of the head part of the front sleeve and the second inner step surface of the inner cavity of the shell body; the conductor passes through the head part of the front sleeve and enters the front part of the inner cavity of the shell body; and the retaining ring of the conductor is blocked by the head part of the front sleeve.

2. The connector for the photovoltaic cell according to claim 1, wherein an inner diameter of the main body of the front sleeve is larger than that of the head part of the front sleeve, and two inner walls are in transitional connection through an inclined surface.

3. The connector for the photovoltaic cell according to claim 1, wherein a plurality of non-return teeth which extend inward are arranged on the main body of the front sleeve; an inner diameter of a ring formed by the non-return teeth is larger than the outer diameter of the conductor and less than the outer diameter of the retaining ring; when the conductor passes through the head part of the front sleeve, the retaining ring causes the non-return teeth to deform; and the retaining ring is propped by the non-return teeth after passing through the non-return teeth.

* * * * *